A. W. GRONDAL.
AUXILIARY SEAT.
APPLICATION FILED JULY 28, 1917.
1,282,220.
Patented Oct. 22, 1918.
2 SHEETS—SHEET 1.
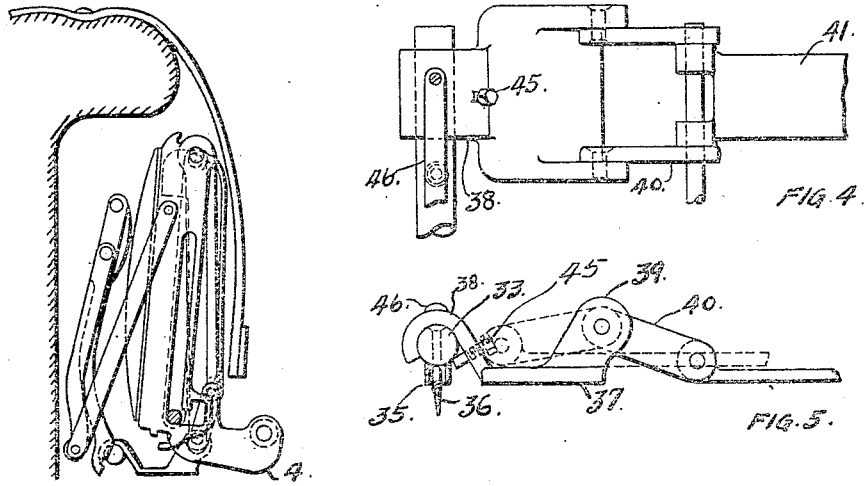
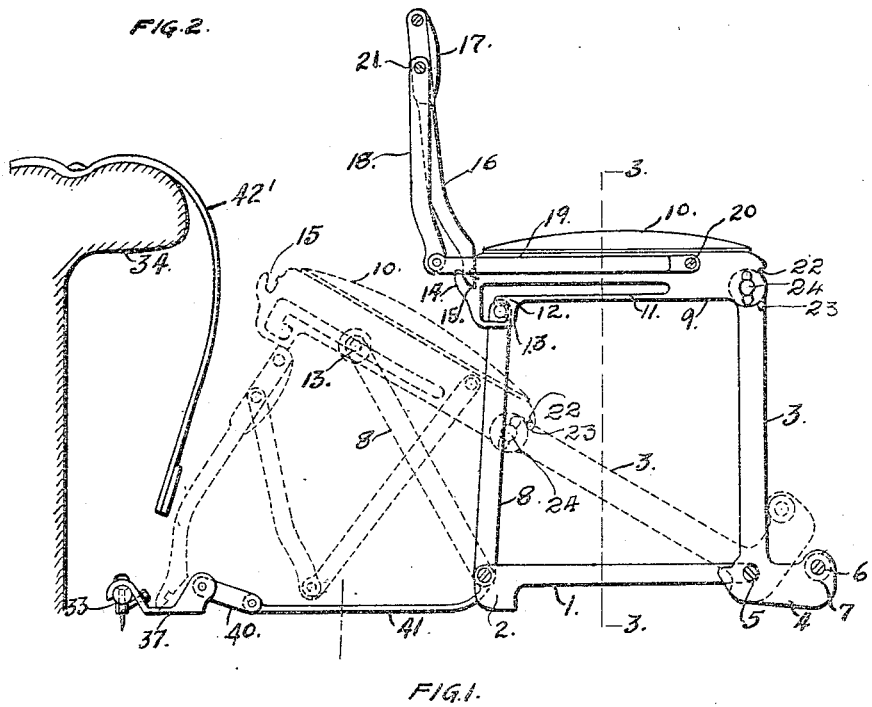
INVENTOR.
AXEL W. GRONDAL.
BY
ATTORNEYS.

A. W. GRONDAL.
AUXILIARY SEAT.
APPLICATION FILED JULY 28, 1917.
1,282,220.
Patented Oct. 22, 1918.
2 SHEETS—SHEET 2.
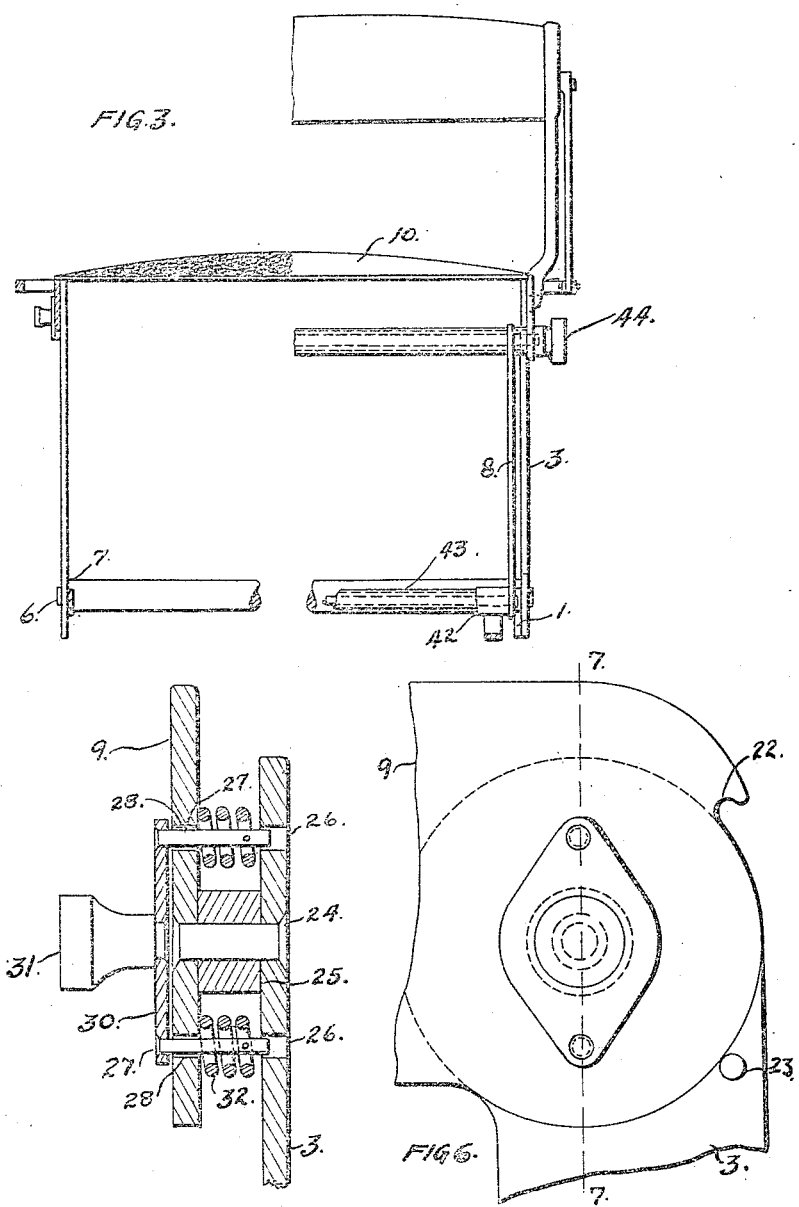
WITNESSES:
INVENTOR.
AXEL W. GRONDAL.
BY Daniel Brennan.
ATTORNEYS.

UNITED STATES PATENT OFFICE.

AXEL W. GRONDAL, OF CHICAGO, ILLINOIS.

AUXILIARY SEAT.

1,282,220.			Specification of Letters Patent.		Patented Oct. 22, 1918.

Application filed July 28, 1917. Serial No. 183,283.

*To all whom it may concern:*

Be it known that I, AXEL W. GRONDAL, a citizen of the United States, residing at Chicago, in the county of Cook and State of Illinois, have invented new and useful Improvements in Auxiliary Seats, of which the following is a specification.

This invention relates to improvements in collapsible seats, and particularly to improvements in seats adapted for temporary arrangement in the bodies of motor vehicles.

It has been known to provide seats of this character in addition to the fixed seats and to provide means for folding the auxiliary seats out of the way of the passages between the fixed seats, when these auxiliary seats are not in use. The latter in the known arrangement were usually folded in direction toward the doors of the vehicle body.

The present invention aims at the provision of an auxiliary seat, which, owing to its location and arrangement of its parts in semi-folded position, may be used as a rest for the thighs of a passenger.

Another object of the invention consists in the provision of auxiliary seats, which in completely folded condition do not obstruct the passages between the permanent seats and which with a part thereof constitute foot rests for the passengers.

It is also an object of the invention to provide an auxiliary seat with a fixed support in the car, and which may be shifted over the whole width of the car and adjusted and locked in any desired position.

A further object constitutes the provision of means for the auxiliary seat, which permit adjusting of the distance of the auxiliary seat from the permanent seat in the vehicle body.

To the accomplishment of the objects stated, and others that will become apparent as the description proceeds, the preferred embodiment of the invention comprises the novel arrangement and construction of parts, to be described in the following specification, and specifically pointed out in the annexed claims. In the accompanying drawings, Figure 1 illustrates in elevation the improved auxiliary seat in operative position, the semi-folded position being shown in dotted lines.

Fig. 2 shows in side elevation the seat in completely folded or collapsed position.

Fig. 3 is partly rear view, partly section of the seat, the section being taken on line 3—3 of Fig. 1.

Fig. 4 is a detail plan view of an anchoring device for the collapsible seat.

Fig. 5 is a side view of the anchoring device.

Fig. 6 is an enlarged view of a portion of the front leg provided with locking means.

Fig. 7 is a section on line 7—7 of Fig. 6.

Referring to the several views of the drawings, 1 designates a horizontal member of the seat longitudinally disposed close to the floor and parallel thereto. As is obvious from Fig. 1, the member 1, at its rear portion, is enlarged as at 2, and this enlargement is rounded at its rear marginal portion and forms a rest for the seat structure. Pivotally connected to, and arranged exteriorly of, the member 1 is a pair of front legs 3 of special construction which, with the exception of the semi-folded position, always are in upright position, as shown in Figs. 1 and 2. The legs 3 are also enlarged at their lower extremity to form floor engaging shoes 4, which at their front and rear portions are rounded, so as to engage the floor with the front portion when in normal or completely collapsed condition, or to engage the floor with the rear portion when in semi-folded position. To obtain stability of the structure, the shoes 4 of the front legs 3 are interconnected by a rod 5, horizontally arranged in registry with the center line of the legs 3. A rod 6 interconnects the front portions of the shoes 4, and to further enhance the stability of the structure, a tube 7 extends between the shoes. Pivoted to the rear end of the members 1, which are interconnected by a rod 43, and arranged interiorly thereof, are the rear legs 8.

The seat proper comprises the longitudinal members 9 of special construction, and forming the support for an upholstered seat 10. The members 9 are formed with longitudinally extending slots 11, and are notched at the rear end to provide a nose 12, which is normally in engagement with a pin 13 at the upper end of the rear leg 8. A clamp 44 (Fig. 3) serves to secure the pin in any position within the slot 11. The member 9 is also formed at its rear end with an upwardly directed tongue 14, thereby forming a V-shaped recess 15 to receive the lower end of back members 16, as is obvious from Fig. 1. The back of the seat comprises, in addition to the members 16, a cushion 17 of suitable construction, constituting the connection between the members 16. Adjacent to the upper end of the back member 16, as at 21, links 18 are pivotally connected thereto, which at their lower extremity are articulated with links 19 pivotally secured to the seat members 9 adjacent the forward end thereof, as at 20. To arrange the auxiliary seat in semi-folded condition, which is indicated in dotted lines in Fig. 1, and in which the seat 10 constitutes a support or a rest for the thighs of a passenger occupying the permanent seat 34, it is only necessary to disengage the pin 13 from the nose 12 of the seat member 9, by loosening the clamp 14, whereupon the pin may be shifted into the narrow longitudinal portion of the slot 11, due to which movement of the parts the members 9 may be arranged to form the extension of the front legs 3. Prior to effecting this arrangement of the members, it is necessary to release the back from its engagement in the V-shaped recess 15 by swinging the entire back frame as a whole about the pivot 20 of the links 19, whereupon the back members 16 are swung rearwardly about the pivot pin 21, so that the lower extremity of the members 16 are received by the anchoring device, to be described hereinafter.

The rear legs 8 will then form an obtuse angle with the members 1, and the pin 13 is arranged approximately intermediate the ends of the slot 11. The upper portion of the cushion 17 serves as support for the rear part of the seat members 9, thus providing a rigid structure.

To further provide for rigidity in the semi-folded or collapsed position of the auxiliary seat, the seat member 9 is formed with a semi-circular recess 22 arranged to receive a pin 23 provided in proper position on the front leg 3 (Fig. 6). By reference to Figs. 1 and 6, it will be seen that in the semi-folded position of the seat structure, pin 23 enters the semi-circular recess 22 of the member 9, so that irrespective of the amount of pressure exerted on the seat 10, a further collapse of the structure is impossible, unless brought about in the manner hereinafter further referred to.

The front leg 3 is provided with a pivot pin 24, whereby it is articulated with the seat member 9, and a washer 25 is interposed between the members 9 and 3, to maintain a permanent spaced relation thereof. In vertical alinement with the pivot pin 24, and at both sides thereof, apertures 26 are arranged at equal distance from the pivot pin to receive pins 27 projecting through apertures 28 of the seat parts 9 and secured to a plate 30, which, provided with a knob 31, is manipulated so as to bring the pins 27 into or out of engagement with the front legs 3. Helical springs 32 abut with one end against the seat member 9, and are fastened at their other ends to the appertaining pins 27, so that normally the plate 30 is held in engagement with the seat member 9, and insures locked condition between the seat members 9 and the legs 3.

From the foregoing it is obvious that in normal operative position the pins 27 of the plate 28 enter the apertures 26 of the leg 3, so that collapsing of the auxiliary seat is impossible, unless the rigid connection between the parts 9 and 3 is released. To effect this, the plate 30, by means of the knob 31, is withdrawn against the tension of the springs 32, so as to withdraw the pin 27 from the apertures 26, the pin 13 of the rear legs 8 may be disengaged from the nose 12 and guided into the narrow longitudinal portion of the slot 11 to bring the members 9 into alinement with the leg 3, in which position, of course, the pin 23 of the leg 3, received within the recesses 22 of the members 9, prevents further movement.

To secure the auxiliary seat in the car body, an anchoring device illustrated in Figs. 4 and 5 is provided, which also permits variation of the distance of said seat from the permanent or fixed seat in the body. The rod 33, arranged close to the floor and at suitable distance from a permanent seat 34, is maintained at a proper distance from the floor by tubular members 35 formed at its upper end with a seat to properly support the rod 33. Threaded members 36 extend through the rod 33 and through the bushings 35, and are in threaded engagement with the floor of the vehicle body. A plate 37 formed with an extension 38, which encompasses partly the rod 33, is formed at its forward portion with upright lugs 39, to which are secured a pair of connecting links 40, which are articulated with a strap 41 terminating at its forward portion in a tubular member 42 secured to the rod 43. As is indicated in dotted lines in Fig. 5, the links 40 may extend forwardly from the lug 39, or may be swung back into the extreme rear position, or, if preferred, may occupy an intermediate position, whereby the distance between the auxiliary seat and the permanent seat may be varied at will. The auxiliary seat may, of course, be shifted throughout the width of the car body along the rod 33. To secure the seat in adjusted position, a set-screw 45 is arranged extending through the extension 38 into engagement with the rod 33. A bar 46 interconnects the parts 38 of the plates 37. In Fig. 1, the permanent seat 34 is shown with a depending flap or cover 42', which serves to cover the collapsed auxiliary seat, without, however, preventing the projecting portions of the shoes 4 to serve as foot rests for a passenger occupying the permanent seat 34.

The arrangement of the auxiliary seat in operative position and its collapse to serve as a thigh rest has been explained hereinbefore, and further reference thereto is thought to be superfluous. To completely collapse the seat, whereby it is folded into the space underneath the seat 34, the seat proper and the legs 3 are brought out of alinement, it being understood that the members 9 and the legs 3 may be also secured in extended position by the provision of additional apertures 26, into which the pins 27 project. In the latter case, it is necessary to release the members 3 and 9 from locked position, whereupon these members are folded together, such that the rear portion of the members 9 are brought adjacent to the lower portions of the legs 3. Simultaneously, the members 1 and 8 are folded such that their pivotal connection is placed adjacent to the pivotal connection between the members 9 and 3, as indicated in Fig. 2. The parts of the seat structure are then brought into compact arrangement and the whole shifted to the space underneath the seat 34, to be covered by the flap 42 thereof.

While the drawings illustrate the preferred embodiment of the invention, it is to be understood that I do not limit myself to the details exactly as shown. The modification shown is merely indicative of the principle of the invention, the scope of which is to be determined solely by the appended claims.

I claim:—

1. In combination with a fixed seat, a collapsible seat structure spaced therefrom and comprising a seat, front legs pivotally connected to said seat, means for locking the pivotal connection of said seat and front legs in normal position, a back frame, and rear legs movably connected to said seat and back frame, whereby the seat may be shifted with respect to said rear legs to form an extension of said front legs, said back frame being movably connected to and forming a support for the seat when arranged to form a thigh rest for the occupant of said fixed seat.

2. In combination with a fixed seat, a seat structure spaced therefrom and collapsible toward said fixed seat, said collapsible seat comprising a seat, front legs pivotally connected to said seat, rear legs movably connected to said seat, means for securing said front and rear legs in adjusted position to said seat, and means for supporting the seat in oblique position so that the seat forms a thigh rest for the occupant of said fixed seat.

3. In combination with a fixed seat, a seat structure spaced therefrom and collapsible toward said fixed seat, said collapsible seat comprising a seat, front legs pivotally connected to said seat, rear legs adjustably connected to said seat, and adjustable with respect to said front legs, and means for supporting the seat in oblique position so that the seat forms a thigh rest for the occupant of the fixed seat.

4. In combination with a fixed seat, a collapsible seat structure spaced therefrom and comprising a seat frame, front legs pivotally connected to said seat frame, rear legs loosely connected to said seat frame, a back frame, and a plurality of links pivotally interconnecting said back and seat frames, said back frame forming a support for the seat frame when arranged to form a thigh rest for the occupant of the fixed seat.

5. A collapsible seat structure comprising a seat frame, front legs pivotally connected to said seat frame, rear legs pivotally and slidably connected to said seat frame, a back frame pivotally secured to said seat frame, and means for securing said structure in normal operative position and in semifolded position in which said seat frame forms the extension of said front legs.

6. A collapsible seat structure comprising a seat frame, front legs pivotally connected to said seat frame, rear legs slidably connected to said seat frame, bars pivotally connecting front and rear legs respectively, and a back frame pivotally connected to said seat frame, the pivotal connections between said seat frame and front legs, and between said rear legs and bars, respectively, being in proximity in collapsed position of said structure.

7. A collapsible seat structure comprising a seat frame, front legs pivotally connected to said seat frame, rear legs slidably and pivotally connected to said seat frame, bars interconnecting the lower ends of front and rear legs respectively, a back frame, and links pivotally interconnecting said back and seat frames, the pivotal connections between said seat frame and front legs, and rear legs and bars, respectively, being in proximity in collapsed position of said structure, said links permitting said back frame to occupy the upright position in any position of said structure.

8. In combination with a fixed seat, a collapsible seat structure spaced therefrom and comprising a seat, front legs pivotally connected to said seat, rear legs slidably and pivotally connected to said seat, means for supporting the seat in oblique position to form a thigh rest for the occupant of the fixed seat, and flexible means for varying the distance of the collapsible seat from the fixed seat.

9. In combination with a fixed seat, a collapsible seat structure spaced therefrom and comprising a seat, front legs pivotally connected to said seat, rear legs loosely connected to said seat, means for supporting the seat in oblique position to form a thigh rest for the occupant of the fixed seat, an anchoring device secured to the floor, and an adjustable connection between said device and said collapsible seat structure.

10. In combination with a fixed seat, a collapsible seat structure spaced therefrom and comprising a seat, front legs pivotally connected thereto, rear legs having a pin and slot connection with said seat, bars pivotally interconnecting front and rear legs respectively, the pivotal connection between said seat and front legs and the diagonally opposed pivot being in proximity when the structure is collapsed underneath said fixed seat, said front legs having means serving as foot rests for the occupant of the fixed seat.

11. In combination with a fixed seat, a collapsible seat structure spaced therefrom and comprising a seat, front legs pivotally connected to said seat and having forwardly extending shoes, a rod interconnecting said shoes, rear legs having a pin and slot connection with said seat, bars pivotally interconnecting front and rear legs respectively, the pivot between said seat and front legs remaining relatively fixed, and the pivot between the rear legs and bars being moved close to the first named pivot in collapsing the structure.

12. A collapsible seat structure comprising a seat frame, front legs pivotally connected to said seat frame, rear legs having a pin and slot connection with said frame, means for securing the rear legs in any adjusted position to said seat frame, bars pivotally interconnecting the lower ends of front and rear legs respectively, a back frame, a plurality of pivotally interconnected links articulated respectively with the back frame and seat frame, said seat frame having recesses to releasably hold the lower end of said back frame, the pivot between said seat and front legs remaining relatively fixed and the pivot between the rear legs and bars being moved close to the first named pivot in collapsing the structure.

AXEL W. GRONDAL.

Copies of this patent may be obtained for five cents each, by addressing the "Commissioner of Patents, Washington, D. C."